UNITED STATES PATENT OFFICE.

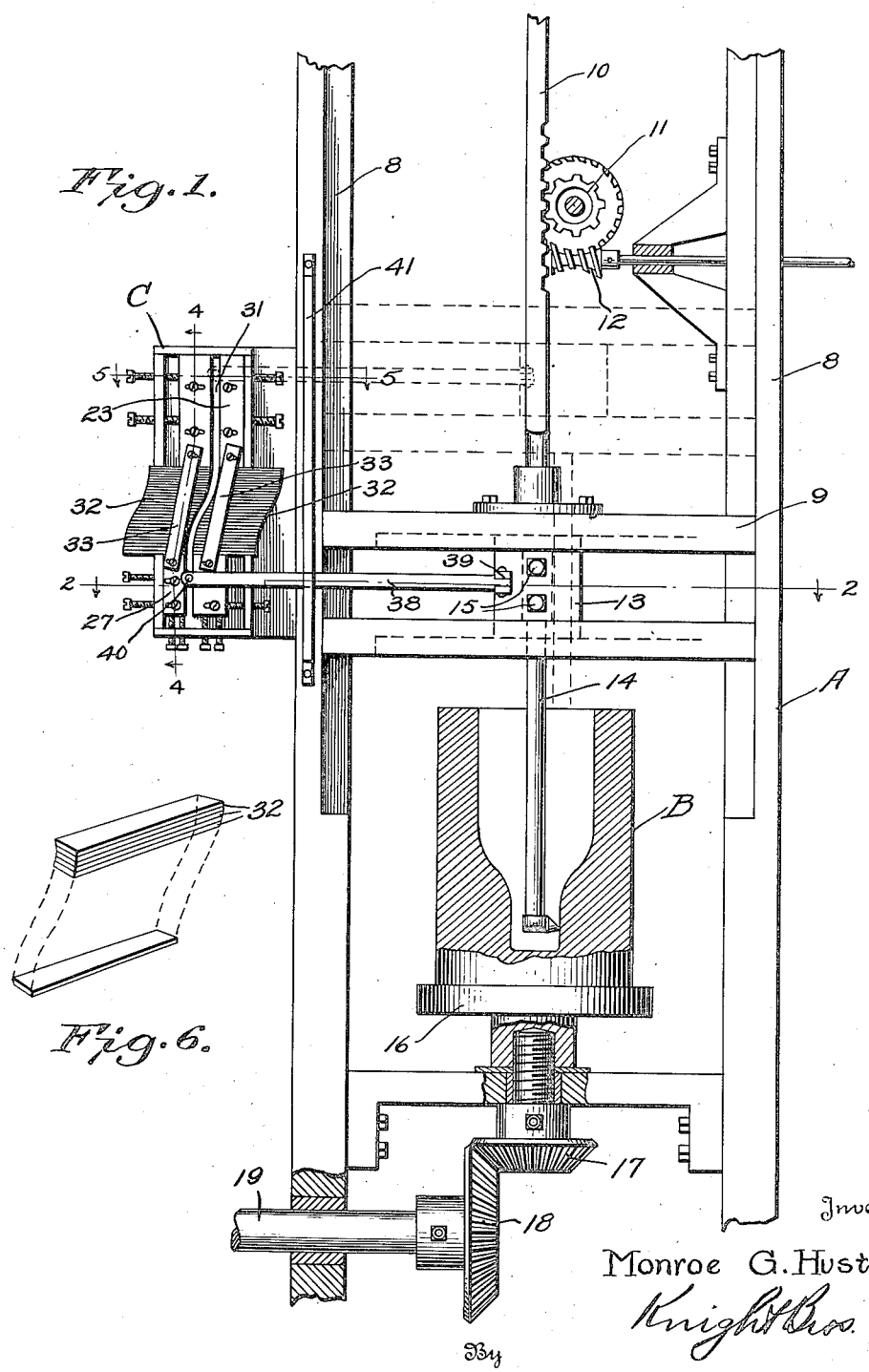

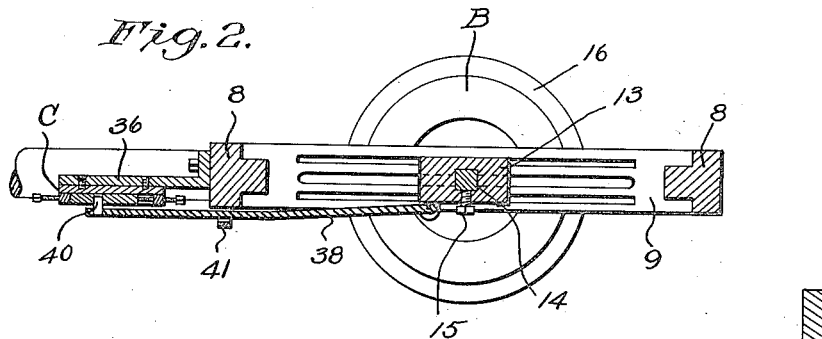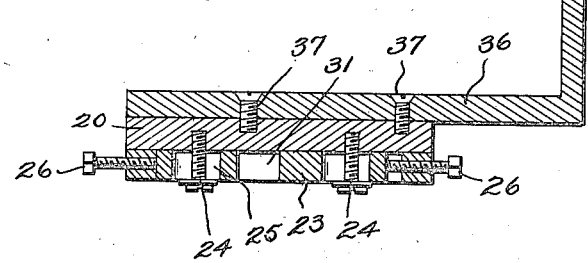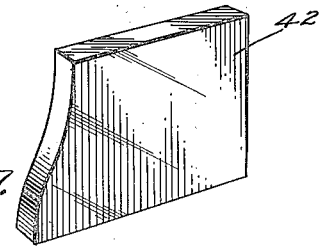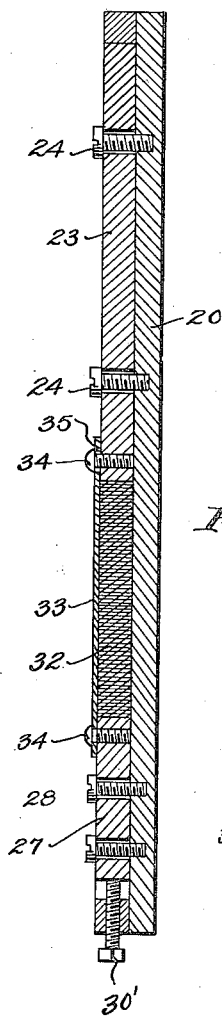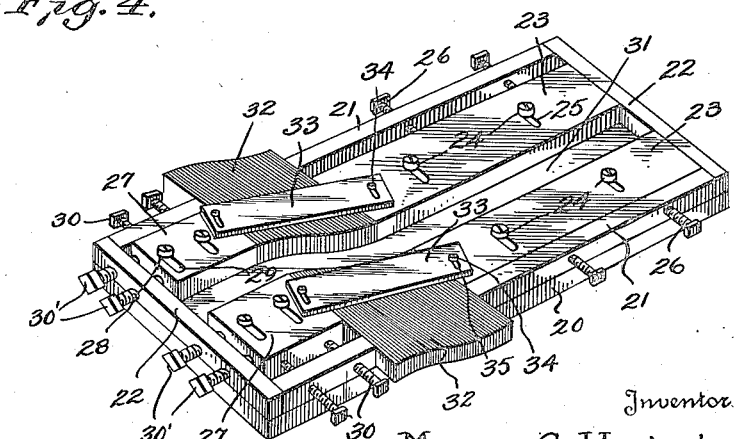

MONROE G. HUSTED, OF BRIDGETON, NEW JERSEY.

TOOL-GUIDING ATTACHMENT FOR LATHES.

1,407,419.  Specification of Letters Patent.  Patented Feb. 21, 1922.

Application filed August 5, 1920. Serial No. 401,462.

*To all whom it may concern:*

Be it known that I, MONROE G. HUSTED, a citizen of the United States, and resident of Bridgeton, in the county of Cumberland and State of New Jersey, have invented certain new and useful Improvements in a Tool-Guiding Attachment for Lathes, of which the following is a specification.

My invention relates to a tool guiding attachment for lathes, and more particularly to a cam groove member of an adjustable nature.

In the manufacture of bottle molds it is necessary to provide a guide-way or groove for controlling the cutter used in fashioning the bottle molds. The practice generally is to make a new cam groove or guiding element whenever an order for a different shaped bottle mold is received. These molds must vary according to the required shape of the neck and breast of the bottle and the base dimensions. It is obvious, therefore, that when an order for a small number of molds is received, the necessity of making a special cam guiding member in order to fashion the molds involves considerable expense and labor, and necessarily makes the operation an inefficient one from a commercial standpoint.

Therefore, the primary object of my invention is to provide a cam groove or guiding member of such a construction that the same may be adjusted within certain limits to accommodate different forms of molds.

In carrying out my invention I form the portions of the cam groove which correspond to the body and neck proper of the bottle, of integral plates, which may be adjusted transversely to thereby increase or decrease the inside diameter of the mold, and consequently the size of the bottle. In order to enable me to fashion the curved portion of a bottle neck and breast to meet the various requirements, I provide the portion of the cam groove corresponding to this portion of the neck and breast of a multiplicity of thin plates or leaves. By such a construction minute changes of the curvature of this portion of the cam may be had, and a cam groove provided which will meet practically all requirements of a device of this sort.

Various other advantages and objects of my invention will be made more apparent in the specification and in the drawings, in which—

Fig. 1 is a side elevation, partly in section, of a bottle mold forming machine equipped with my invention;

Fig. 2 is a horizontal transverse section taken on line 2—2 of Fig. 1;

Fig. 3 is a perspective view of the tool guiding member which forms my invention;

Fig. 4 is a vertical section taken on line 4—4 of Fig. 1;

Fig. 5 is a transverse horizontal section taken on line 5—5 of Fig. 1;

Fig. 6 is a detail perspective view of one of the parts of the guiding member; and Fig. 7 is a similar view of a modified form thereof.

Referring now more particularly to the drawings, the letter A represents a bottle mold shaping machine, B the bottle mold, and C the cam groove member to which my invention relates.

In order to illustrate the relation and application of this cam groove member to a bottle mold forming machine, reference may be had to Fig. 1, in which one type of such a machine is illustrated. In the machine illustrated, the numeral 8 indicates the side frames thereof, and 9 a transversely disposed tool carrier. This tool carrier 9 is preferably slidably supported in the frame 8. Extending vertically therefrom is a rack bar 10, which meshes with a pinion 11, which in turn is operated by a worm gear 12 in any suitable manner to move the tool carrier vertically.

A tool socket 13 is supported within the tool carrier 9 in such a manner as to allow transverse movement therein. A suitable cutter tool 14 is held by the tool socket 13 by means of clamping bolts 15.

The bottle mold indicated by B is supported in any suitable manner upon a rotating table 16. This table has keyed thereto a beveled gear 17, meshing with a second beveled gear 18 secured to a shaft 19. The shaft 19 may be operated from any suitable source of power.

In practice, the mold B has the center portion thereof bored out or cut away in some similar manner, to enable the cutting tool 14 to be inserted therein. The function of the cutting tool 14 is to fashion the bottle mold to the style required, and it is therefore obvious that means must be provided for guiding the cutting tool 14 during the cutting operation. It is understood that during this cutting operation the table 16 is rotated, thereby carrying the mold B about the cutter.

The adjustable cam member for guiding the cutter is formed with a base plate 20, provided upon one face thereof with peripheral side walls 21 and end walls 22. These peripheral walls form a sort of housing, within which are placed the adjustable plates forming the groove.

At one end of the cam member are two plates 23, secured against vertical displacement by bolts 24 passing through transversely disposed elongated slots 25 formed in the plates 23. These bolts extend through the slots and are screw-threaded into the base plate 20 of the cam member. Passing through the peripheral side walls 21 are set screws 26, which have their inner ends abutting the vertical faces of the plates 23. It is obvious, therefore, that the position of the plates 23 may be shifted transversely of the base 20 and the plates held in position by tightening the bolts 24, and set screws 26.

Adjacent the other end of the cam member are similar plates 27, provided with bolts 28 passing through elongated transversely disposed slots 29, these bolts being screw-threaded into the base in a manner similar to the bolts 24. Set screws 30 passing through the peripheral walls 21 abut the vertical faces of these plates 27 and cooperate with the bolts 28 to retain these plates in their adjusted positions.

From the foregoing it is obvious that a groove, indicated by the numeral 31, is provided, which groove is capable of being shifted laterally with respect to the base in the manner hereinbefore described. The two sections of the grooves which are formed by the plates 23 and 27 correspond to the straight portions of the bottle mold. In order to adapt the cam to shape the curved portion of the bottle mold to any required curve, I form this portion of the groove of a multiplicity of thin plates or leaves 32. These leaves are of a sufficient number to fill the space between the ends of the plates 23 and 27, and are held in place by retaining strips 33, provided with bolts 34 passing through transversely elongated slots 35 in the ends of the retaining strips. Endwise pressure may be applied to the plates 27 to assist in clamping these multi-leaved segments in place, by the provision of set screws 30' passing through the end wall 22. It is apparent, therefore, that curves of various degrees may be formed by adjusting this multi-leaved portion of the cam groove.

The cam member is secured to the frame 8 of the mold forming machine by bracket 36, to which bracket the cam member is rigidly secured by screws 37 passing through the bracket and into the base 20.

To operatively connect the tool socket 13 to this cam member, a horizontal guide arm 38 is provided, which is hingedly connected to the socket, as at 39, and carries upon its outer end a roller 40 which travels in the cam groove 31. A retaining strip 41 can be bolted to one of the side frames to prevent outward movement of the arm 38, and consequential displacement thereof.

If a great number of molds, embodying a neck with a curve of the same degree, is required, the multi-leaved segments of the groove may be replaced by plates 42, as illustrated in Fig. 7. These plates are found efficient when it is unnecessary to constantly replace them.

From the foregoing it is apparent that when the mold B is placed upon the table 16 and rotated, and the cutting tool 14 inserted at the top thereof, the roller 40 will be in the upper end of the groove 31. In this position the guiding member 38 will have moved the cutter to the right (in Fig. 1) to cut the mold at the portion corresponding to the sides of the bottle, to the proper size. As the material is cut away and the mold fashioned, the tool will be moved downwardly into the mold B by operating the rack 10. As the tool carrier 9 moves downwardly the roller 40 traveling in the groove 31 will move the tool socket carrying the tool transversely of the tool carrier, thereby fashioning the neck and curved portion of the bottle mold to the proper size.

The cam, because of its adjustable plates, may be adjusted to cause the cutter to fashion the mold of any number of sizes, within, of course, the limits of the transverse size of the cam member. It is also apparent that by adjusting the mluti-leaved segment curves of many different degrees may be formed in the cam groove 31, and consequently bottle molds embodying similar curves may be made.

It will be likewise apparent that I am not limited to this particular adaptation of my adjustable cam member, inasmuch as it may be applied equally as well to many other machines in which cam control is used. The size of the multi-leaved segments may be increased or diminished, and my invention comprehends a cam groove which is formed of any number of these multi-leaved segments.

Various other changes not hereinbefore set forth may be made from the specific structure illustrated, without departing from the spirit and scope of my invention, and I particularly reserve this right.

Having thus described my invention, what I claim is:—

1. A tool guiding attachment for lathes, embodying a base, adjustable plates and multi-leaved segments, substantially as described.

2. A tool guiding attachment for lathes, comprising a base, plates adjustably mounted upon said base to form a groove therebetween, and a multi-leaved segment forming a part of said groove, as and for the purpose set forth.

3. A tool guiding attachment for lathes comprising the combination with a cutting tool of a templet for guiding said tool, said templet comprising a base, plates mounted upon said base and formed with straight edges, said plates being adjustable relatively to said base and multi-leaved segments secured to said base, said multi-leaved segments forming with said plates a groove, said multi-leaved segments being adjustable for varying the contour of said groove.

4. A tool guiding attachment for lathes comprising a cutting tool, means for moving said cutting tool to fashion the work to a pre-determined design comprising a templet provided with a base, plates adjustably mounted on said base, multi-leaved segments secured to said base and cooperating with said plates to form a groove, the leaves of said multi-leaved segments being displaceable to vary the contour of their operative edges.

5. A lathe for forming bottle molds, comprising a rotary work support, a cutting tool carrier, a cutting tool, means for advancing said cutting tool into the work, and tool guiding attachment comprising a base, plates adjustably mounted upon said base, and multi-leaved segments secured on said base and forming a groove with said plates which is variable transversely of said base, substantially as described.

6. An adjustable cam groove member, comprising a base, peripheral walls formed upon said base, plates mounted for transverse adjustment upon said base, segments composed of a multiplicity of leaf-like members secured to said base, said segments and plates cooperating to form a groove upon said base, substantially as described.

MONROE G. HUSTED.